US007136378B2

(12) United States Patent
Bi et al.

(10) Patent No.: US 7,136,378 B2
(45) Date of Patent: Nov. 14, 2006

(54) SECURE ATM-BASED DISTRIBUTED VIRTUAL TANDEM SWITCHING SYSTEM AND METHOD

(75) Inventors: Haifeng Bi, Austin, TX (US); Matthew Wayne Stafford, Austin, TX (US); Tina M. Sigarto, Raleigh, NC (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 10/813,052

(22) Filed: Mar. 31, 2004

(65) Prior Publication Data

US 2004/0179531 A1    Sep. 16, 2004

Related U.S. Application Data

(63) Continuation of application No. 09/705,793, filed on Nov. 6, 2000, now Pat. No. 6,757,278, which is a continuation-in-part of application No. 09/534,308, filed on Mar. 23, 2000, which is a continuation-in-part of application No. 09/287,092, filed on Apr. 7, 1999, now Pat. No. 6,169,735.

(60) Provisional application No. 60/083,640, filed on Apr. 30, 1998.

(51) Int. Cl.
  *H04L 12/66* (2006.01)
  *H04L 12/50* (2006.01)
  *H04L 12/56* (2006.01)

(52) U.S. Cl. .................... 370/356; 370/395.3

(58) Field of Classification Search ........ 370/352–356, 370/395.1, 395.5, 395.53, 400–401
See application file for complete search history.

(56) References Cited

U.S. PATENT DOCUMENTS 5,260,978 A    11/1993  Fleischer et al.

(Continued)

FOREIGN PATENT DOCUMENTS

CA    2411027    5/2001

(Continued)

OTHER PUBLICATIONS

ATM Forum Technical Committee "ATM Security Specification," Version 1.0, Document af-sec-0100-001, Feb. 1999.

(Continued)

*Primary Examiner*—Kevin C. Harper
(74) *Attorney, Agent, or Firm*—Greenblum & Bernstein, P.L.C.

(57) ABSTRACT

A method for providing secure communications through a communications network comprising ATM channels and TDM channels. The communications network includes at least one closed user group of network elements configured to communicate with only other network elements in the closed user group. The method receives a connection setup request at an ingress ATM switch, via a UNI attached to the ATM switch, in response to a call initiated through a TDM channel. The UNI interfaces a first network element of the closed user group with the ATM switch. The method further verifies that an ATM End System Address (AESA) contained in calling party information of the connection setup request is consistent with the attached UNI. Additionally, the method establishes a connection with at least a second network element of the closed user group through an egress ATM switch in the communications network when the AESA is consistent with the attached UNI.

13 Claims, 4 Drawing Sheets

U.S. PATENT DOCUMENTS

| | | | |
|---|---|---|---|
| 5,339,318 A | 8/1994 | Hemmady et al. | |
| 5,363,369 A | 11/1994 | Hemmady | |
| 5,365,524 A | 11/1994 | Hiller et al. | |
| 5,392,402 A | 2/1995 | Robrock, II | |
| 5,428,607 A | 6/1995 | Hiller et al. | |
| 5,434,853 A | 7/1995 | Hemmady et al. | |
| 5,434,854 A | 7/1995 | Focarile et al. | |
| 5,438,565 A | 8/1995 | Hemmady et al. | |
| 5,459,722 A | 10/1995 | Sherif | |
| 5,463,621 A | 10/1995 | Suzuki | |
| 5,483,527 A | 1/1996 | Doshi et al. | |
| 5,490,140 A | 2/1996 | Abensour et al. | |
| 5,513,174 A | 4/1996 | Punj | |
| 5,539,884 A | 7/1996 | Robrock, II | |
| 5,568,475 A | 10/1996 | Doshi et al. | |
| 5,581,551 A | 12/1996 | Fundneider et al. | |
| 5,619,500 A | 4/1997 | Hhiekali | |
| 5,623,491 A | 4/1997 | Skoog | |
| 5,638,365 A | 6/1997 | Duault et al. | |
| 5,684,800 A * | 11/1997 | Dobbins et al. | 370/401 |
| 5,703,876 A | 12/1997 | Christie | |
| 5,710,769 A | 1/1998 | Anderson et al. | |
| 5,719,863 A | 2/1998 | Hummel et al. | |
| 5,757,783 A | 5/1998 | Eng et al. | |
| 5,781,320 A | 7/1998 | Byers | |
| 5,784,371 A | 7/1998 | Iwai | |
| 5,796,836 A | 8/1998 | Harkham | |
| 5,825,750 A | 10/1998 | Thompson | |
| 5,845,211 A | 12/1998 | Roach, Jr. | |
| 5,867,571 A | 2/1999 | Borchering | |
| 5,883,893 A | 3/1999 | Rumer et al. | |
| 5,889,773 A | 3/1999 | Stevenson, III | |
| 5,896,377 A | 4/1999 | Boot et al. | |
| 5,898,673 A | 4/1999 | Riggan et al. | |
| 5,914,956 A | 6/1999 | Williams | |
| 5,920,559 A | 7/1999 | Awaji | |
| 5,926,464 A | 7/1999 | Fraser | |
| 5,930,238 A | 7/1999 | Nguyen | |
| 5,943,321 A | 8/1999 | St-Hilaire et al. | |
| 5,953,316 A | 9/1999 | Lazar et al. | |
| 5,956,334 A | 9/1999 | Chu et al. | |
| 5,991,301 A | 11/1999 | Christie | |
| 5,991,746 A | 11/1999 | Wang | |
| 6,009,100 A | 12/1999 | Gausmann et al. | |
| 6,028,933 A | 2/2000 | Heer et al. | |
| 6,031,840 A | 2/2000 | Christie et al. | |
| 6,035,405 A | 3/2000 | Gage et al. | |
| 6,049,531 A | 4/2000 | Roy | |
| 6,055,232 A | 4/2000 | Ward et al. | |
| 6,101,183 A | 8/2000 | Byers | |
| 6,118,759 A | 9/2000 | Ohyoshi et al. | |
| 6,122,275 A | 9/2000 | Karol et al. | |
| 6,134,235 A | 10/2000 | Goldman et al. | |
| 6,141,339 A | 10/2000 | Kaplan et al. | |
| 6,151,315 A | 11/2000 | Ash et al. | |
| 6,169,735 B1 | 1/2001 | Allen, Jr. et al. | |
| 6,175,622 B1 | 1/2001 | Chiniwala et al. | |
| 6,195,333 B1 | 2/2001 | Wise | |
| 6,195,714 B1 | 2/2001 | Li et al. | |
| 6,219,348 B1 | 4/2001 | Allen, Jr. et al. | |
| 6,252,952 B1 | 6/2001 | Kung et al. | |
| 6,263,212 B1 | 7/2001 | Rose et al. | |
| 6,275,493 B1 | 8/2001 | Morris et al. | |
| 6,282,194 B1 | 8/2001 | Cheesman et al. | |
| 6,343,065 B1 | 10/2001 | Serbrst | |
| 6,339,830 B1 | 1/2002 | See et al. | |
| 6,345,048 B1 | 2/2002 | Allen, Jr. et al. | |
| 6,389,011 B1 | 5/2002 | Allen, Jr. et al. | |
| 6,470,018 B1 | 10/2002 | Wiley et al. | |
| 6,563,918 B1 | 5/2003 | Nelson et al. | |
| 6,643,282 B1 | 11/2003 | Christie | |
| 6,757,278 B1 | 6/2004 | Bi et al. | |
| 6,765,903 B1 | 7/2004 | Allen et al. | |
| 6,782,004 B1 | 8/2004 | Brusilovsky et al. | |
| 6,870,827 B1 | 3/2005 | Voit et al. | |
| 2001/0036188 A1 | 11/2001 | Carlsson | |
| 2002/0009086 A1 | 1/2002 | Gallant et al. | |
| 2002/0057693 A1 * | 5/2002 | Gallant | 370/395 |
| 2002/0061101 A1 * | 5/2002 | Hall et al. | 379/221.08 |
| 2002/0064129 A1 | 5/2002 | Serbest et al. | |
| 2002/0075855 A1 | 6/2002 | Bruno et al. | |
| 2002/0093947 A1 | 7/2002 | Allen, Jr. et al. | |
| 2004/0022237 A1 * | 2/2004 | Elliott et al. | 370/356 |

FOREIGN PATENT DOCUMENTS

| | | |
|---|---|---|
| CA | 2299438 | 9/2003 |
| EP | 0603915 | 6/1994 |
| EP | 1086550 | 3/2001 |
| EP | 1252749 | 10/2002 |
| EP | 1302026 | 4/2003 |
| MX | 004087 | 4/2000 |
| TW | 88106842 | 12/2001 |
| WO | 99/57851 | 11/1999 |
| WO | 01/54365 | 7/2001 |
| WO | 01/91379 | 11/2001 |
| WO | 02/37779 | 5/2002 |

OTHER PUBLICATIONS

ATM Forum Technical Committee "Traffic Management Specification", Version 4.0, Document af-tm-0056-000, Apr. 1996

ATM Forum Technical Committee, "Circuit Emulation Service Interoperability Specification", Version 2.0, published Jan. 1997.

ATM Forum Technical Committee, "Voice and Telephony Over ATM-ATM Trunking Using AAL 1 for Narrowband Services", Version 1.0, published Jul. 1997.

Clark, R. J. et al., "Deploying ATM in a Data Network: An Analysis of SVC Requirements", Oct. 16, 1995, p. 9-18.

Clark, R. J. et al., "Deploying ATM in a Data Network: An Analysis of SVC Requirements", Oct. 16, 1995, p. 9-18.

ITU-T Recommendation Q.2955.1, "Stage 3 Description for Community of Interest Supplementary Services Using B-ISDN DSS 2: Closed User Group (CUG)", Jun. 1997.

Jomer, P., "Connection Caching of Traffic Adaptive Dynamic Virtual Circuits", Computer Communication Review, vol. 19, No. 4, Sep. 1989, pp. 13-24.

Lucent Technologies, "NavisCore ATM Configuration Guide", Chapter 15, pp. 15-1 to 150-13 (Applicants note that this document is mentioned on p. 14 of the specification of the present application).

Malik, O., "It's the Voice, Stupid", Forbes, Digital Tool, Sep. 8, 1999.

U.S. Appl. No. 10/024,182.

U.S. Appl. No. 09/576,036.

U.S. Appl. No. 09/534,308.

* cited by examiner

SECURE ATM-BASED DISTRIBUTED VIRTUAL TANDEM SWITCHING SYSTEM AND METHOD

CROSS-REFERENCE TO RELATED APPLICATIONS

This application is a continuation of U.S. patent application Ser. No. 09/705,793, filed on Nov. 6, 2000, now U.S. Pat. No. 6,169,278 which is a continuation-in-part of pending U.S. patent application Ser. No. 09/534,308, filed Mar. 23, 2000, which is a continuation-in-part of U.S. patent application Ser. No. 09/287,092, filed Apr. 7, 1999 now U.S. Pat. No. 6,169,735 which claims the benefit of U.S. Provisional Patent Application No. 60/083,640 filed on Apr. 30, 1998, the disclosures of which are expressly incorporated herein by reference in their entireties.

BACKGROUND OF THE INVENTION

1. Field of the Invention

The present invention relates to the field of telecommunications. More particularly, the present invention relates to secure asynchronous transfer mode (ATM)-based telecommunications networks.

2. Background Information

In current time division multiplexed (TDM)-based telecommunications networks, signaling messages for managing telephone calls are carried on a network different from a network carrying the telephone conversations themselves. In fact, the control network, which carries the messages that establish and tear down connections, is physically separate from the bearer network, which carries the customer, or bearer traffic. In other words, control and bearer traffic are segregated. One reason for the segregation is to prevent unauthorized access to voice connections. Control traffic in the typical voice network will be referred to as narrowband control traffic, in contrast to ATM control traffic.

A new voice trunking system using ATM technology has been proposed in U.S. patent application Ser. No. 09/287,092, entitled "ATM-Based Distributed Virtual Tandem Switching System." The architecture represents a new paradigm of networking that requires re-thinking network security. In this system, shown in FIG. 1, voice trunks from end office switches 16, 18 are converted to ATM cell streams by a first or second trunk inter-working function (T-IWF) device 10. The T-IWFs 10 are distributed to each end office 16, 18, and are controlled by a centralized control- and signaling inter-working function (CS-IWF) device 12. The CS-IWF 12 performs call control functions as well as conversion between the narrowband Signaling System No. 7 (SS7) protocol and a broadband signaling protocol. The T-IWFs 10, CS-IWF 12, and an ATM network 14 of ATM switches form the ATM-based distributed virtual tandem switching system. According to this voice trunking over ATM (VTOA) architecture, trunks are no longer statistically provisioned as DS0 time slots. Instead, the trunks are realized through dynamically established switched virtual connections (SVCs), thus eliminating the need to provision separate trunk groups to different destinations, as done in TDM-based trunking networks.

In the VTOA architecture, narrowband control and bearer traffic are still segregated. ATM control and bearer traffic, however, are not carried on distinct, physically separate networks. That is, signaling messages that control switched virtual connections (SVCs) traverse the same communications links as the bearer traffic carried by the SVCs. Thus, new security risks are present. For example, unauthorized access to the ATM SVCs should be prevented, just as unauthorized access to voice connections in the typical network is currently prevented.

Moreover, in complex multi-service multi-carrier networks, additional security requirements are required. For example, interception and malicious alteration or replay of sensitive operations, administration, and maintenance (OAM) and control messages should be prevented.

Consequently, current security practices and infrastructures must be adapted to make certain that deployments of this new architecture are as secure as the existing TDM voice network.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF THE PREFERRED EMBODIMENTS

Figure 1:
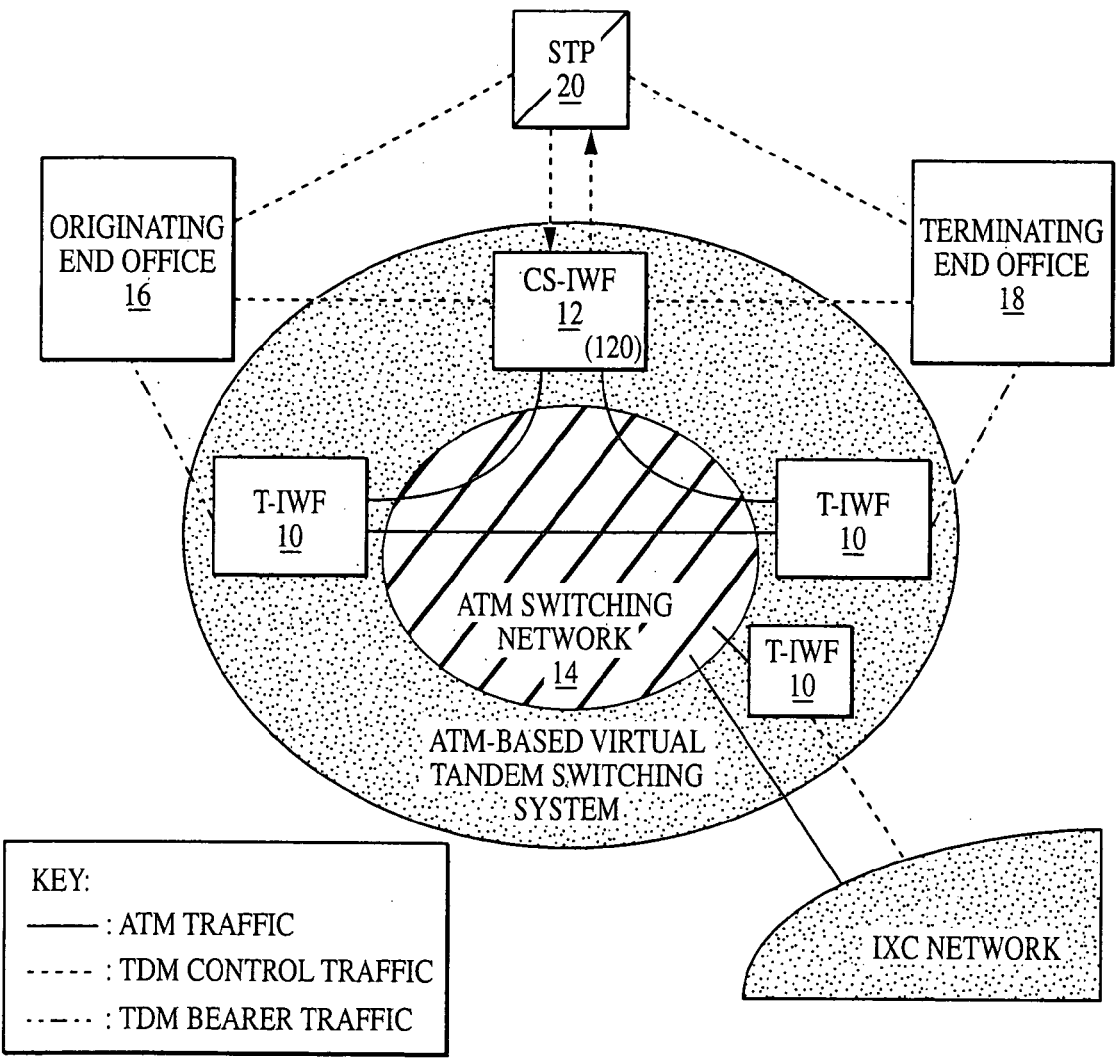
FIG. 1 shows a known virtual trunking over ATM telecommunications network architecture.

In view of the foregoing, the present invention is directed to providing security in the VTOA system. The present invention prescribes security measures to prevent unauthorized access to ATM SVCs. More specifically, the types of traffic present in the VTOA architecture are categorized and requirements concerning the manner in which VTOA traffic may be transported across the ATM distributed switching fabric are presented.

According to an embodiment of the present invention, a telecommunications network is provided that carries control traffic and bearer traffic via ATM communications channels and TDM communications channels. The telecommunications network includes ATM switches and an ATM element management system that manages an ATM switching network formed by the ATM switches The network also includes at least one closed user group consisting of multiple closed user group members. The closed user group members include trunk interworking function (T-IWF) devices configured to receive end office voice trunks from TDM channels and convert the trunks to ATM cell streams and to receive ATM cell streams and convert the ATM cell streams to end office voice trunks; and at least one centralized control and signaling interworking function (CS-IWF) device. The CS-IWF device performs call control functions and interfaces narrowband and broadband signaling for call processing and control within the ATM switching network. The closed user group members also include a VTOA switch management system (SMS). Other elements of the network include end office switches that communicate with the trunk interworking function (T-IWF) devices and the at least one centralized control and signaling interworking function (CS- IWF) device via TDM communications channels. Thus, the closed user group members are restricted to communicating solely with other closed user group members when communicating to each other via the ATM switching network.

According to another aspect of the invention, a method is provided for controlling bearer traffic and control traffic traveling through ATM communication channels and TDM communication channels in a communications network. The network includes at least one closed user group consisting of trunk interworking function (T-IWF) devices that receive end office voice trunks from TDM channels and convert the trunks to ATM cell streams and receive ATM cell streams and convert the ATM cell streams to end office voice trunks. The closed user group also includes at least one centralized control and signaling interworking function (CS-IWF) device that performs call control functions and interfaces narrowband and broadband signaling for call processing and control within the ATM switching network. Finally, the closed user group includes a VTOA switch management system (SMS). The network also includes ATM switches and an ATM element management system that manages an ATM switching network formed by the ATM switches. The method includes transmitting signals via the ATM switching network between closed user group members, and rejecting signals received via the ATM switching network that originate from non-closed user group members. The method may also include denying all control and signaling access requests to traditional voice network elements that are received through the ATM switching network.

The present invention is directed to ATM specific security requirements for the voice trunking over ATM (VTOA) application. Some of these requirements must be implemented at initial VTOA deployment. Supplemental requirements are also provided. The supplemental requirements are designed to provide adequate protection against additional security risks that are introduced when a multi-service ATM infrastructure that switches inter-carrier voice traffic is present. While highly desirable from the outset, adherence to these supplemental requirements should be considered in light of network performance.

The ATM tandem replacement architecture is represented schematically in FIG. 1. The T-IWF 10, CS-IWF 12, and ATM switching network 14 represent the ATM-based virtual tandem switch. The functionality of the virtual tandem is split into trunk interworking function (T-IWF) 10 and control and signaling interworking function (CS-IWF) 12 components.

The CS-IWF 12 bridges between narrowband and broadband signaling, and in turn, provides call set up and tear down instructions to the T-IWFs 10. For example, the narrowband signaling may be in the form of SS7 ISUP (integrated services digital network user part) messages, and the broadband signaling may be standard-based broadband signaling, for example, ATM UNI (user network interface) or PNNI (private network-to-network interface). Exemplary CS-IWF units include the Connection Gateway from Lucent Technologies Inc, and the Succession Call Server, from Nortel Networks Corporation.

In one embodiment, the CS-IWF 12 is a CS-IWF complex 120 including multiple CS-IWF units 12. In this embodiment, each CS-IWF unit 12 must be highly reliable. To achieve this objective, redundant processors are provided within each CS-IWF 12 for protection against processor failure. The redundant processors may operate in an active/standby mode or in a load sharing mode.

Each CS-IWF complex 120 must contain spare capacity for protection. The specific architecture of the CS-IWF complex 120 dictates the spare processing capacity required. For example, in a complex where n=2, if one CS-IWF 12 fails, the remaining CS-IWF 12 must be able to handle the load of the CS-IWF 12 that failed. If three CS-IWFs 12 are provided, any two remaining CS-IWFs 12 should be able to handle the load of the failed CS-IWF 12. Thus, a CS-IWF complex 120 must contain at least two CS-IWF units 12. In general, in a CS-IWF complex 120 of n units, up to k ($k \geq 1$) out of the n CS-IWF units 12 must be provided for the purpose of protection. The objective is that the loss of one CS-IWF 12 unit has no impact on the call handling capacity of the CS-IWF complex 120 as a whole. In the active/standby mode, n-k CS-IWFs 12 are active, and k operate in standby mode. In the load-sharing mode, all n CS-IWFs 12 run at levels less than maximum such that if one of the CS-IWFs 12 should fail, its processing load can be absorbed by the remaining CS-IWFs 12.

The T-IWFs 10 set up and tear down the bearer connections across the ATM switching network 14 and perform the necessary TDM to ATM and ATM to TDM conversions at the endpoints of these ATM bearer connections. Exemplary T-IWFs include the 7R/E Trunk Access Gateway, from Lucent Technologies Inc.; and the Succession Multi-service Gateway 4000 (MG 4000), from Nortel Networks Corporation.

Exemplary ATM switches (in the ATM switching network 14) include the 7470 MSP and 7670 RSP, both manufactured by Alcatel Canada Inc.; the GX 550 Smart Core ATM Switch, manufactured by Lucent Technologies Inc.; and the Passport 15000 Multiservice Switch, manufactured by Nortel Networks Corporation.

FIG. 1 also shows an originating end office switch 16, a terminating end office switch 18, and a signaling transfer point (STP) 20. Exemplary switches include class 5 switches such as: the Lucent Technologies Inc. 1AESS; the Lucent Technologies Inc. 5ESS; the Ericsson AXE-10; and the Northern Telecom (Nortel) DMS-100 switches.

FIG. 1 does not represent the virtual tandem switching system at the ultimate level of detail. To keep the diagram uncluttered, additional components, such as additional CS-IWFs, element management systems and operation support systems have been omitted from the diagram. These components appear in subsequent figures where appropriate. For example, a switch management system (SMS) unit 22 is discussed with reference to FIGS. 2 and 3. The SMS 22 is the element layer manager of the ATM-based virtual tandem. The SMS 22 communicates with the T-IWFs 10 and the CS-IWF 12, and the legacy operation support systems (OSS) 24. Essentially, the SMS 22 controls management of the distributed switch and acts as a man-machine interface enabling a human user to view and control the overall behavior of the VTOA. According to one embodiment, the SMS 22 communicates with other network management systems involved in the virtual tandem, such as the operation support system 24 of the ATM network. The SMS 22 can be located either in a central office or in a data center. Exemplary SMSs 22 include the OneLink. Manager, from Lucent Technologies Inc., and the Succession Network Manager, from Nortel Networks Corporation.

Call control connections and bearer connections appear in both the TDM and ATM domains, although bearer and control are not carefully distinguished on the ATM side in FIG. 1. These distinctions will be made clear in subsequent figures.

It is noted that interexhange (IXC) traffic may be handed off as TDM or ATM streams. Both possibilities are represented in FIG. 1. Note that only the bearer connections, and not control connections, are shown in FIG. 1.

In the present specification, the term "network element" refers to any of the VTOA components (e.g., T-IWF 10, CS-IWF 12, SMS 22); the ATM switches internal to the VTOA system; and the components of the current TDM-based voice network (e.g., Class 5 Switches 16, 18, STP 20). VTOA network element refers to any of the VTOA components such as the T-IWF 10, CS-IWF 12, and SMS 22.

An element management system (EMS) 26 is a system provided by a network element vendor for the purpose of managing that vendor's network elements. Specific examples are the ATM element management system 26 used for the ATM network elements, and the switch management system (SMS) 22 used for the VTOA network elements. The ATM network 14 refers collectively to the ATM switches internal to VTOA and their element management system 26. An exemplary ATM EMS is the NavisCore Multiservice Element Manager, available from Lucent Technologies, Inc.

Operations support systems (OSSs) 24 are management systems that are not packaged with specific vendors' network elements. OSSs communicate with element management systems to extract higher-level information.

The types of traffic present in the distributed tandem architecture are now discussed. The distributed tandem architecture is very different from the TDM-based network architecture. As discussed above, one major distinction is that in the distributed tandem architecture, ATM bearer channels are allocated using in-band signaling. Thus, multiple types of traffic need to be accounted for in the ATM network as well as in the TDM-based portion of the network. The traffic types include voice traffic, control traffic, and OA&M traffic. According to the present invention, there are two types of requirements, namely requirements that exclude some types of traffic from traversing the ATM network, and requirements designed to protect the integrity of traffic that does traverse the ATM switching network.

Figure 2:
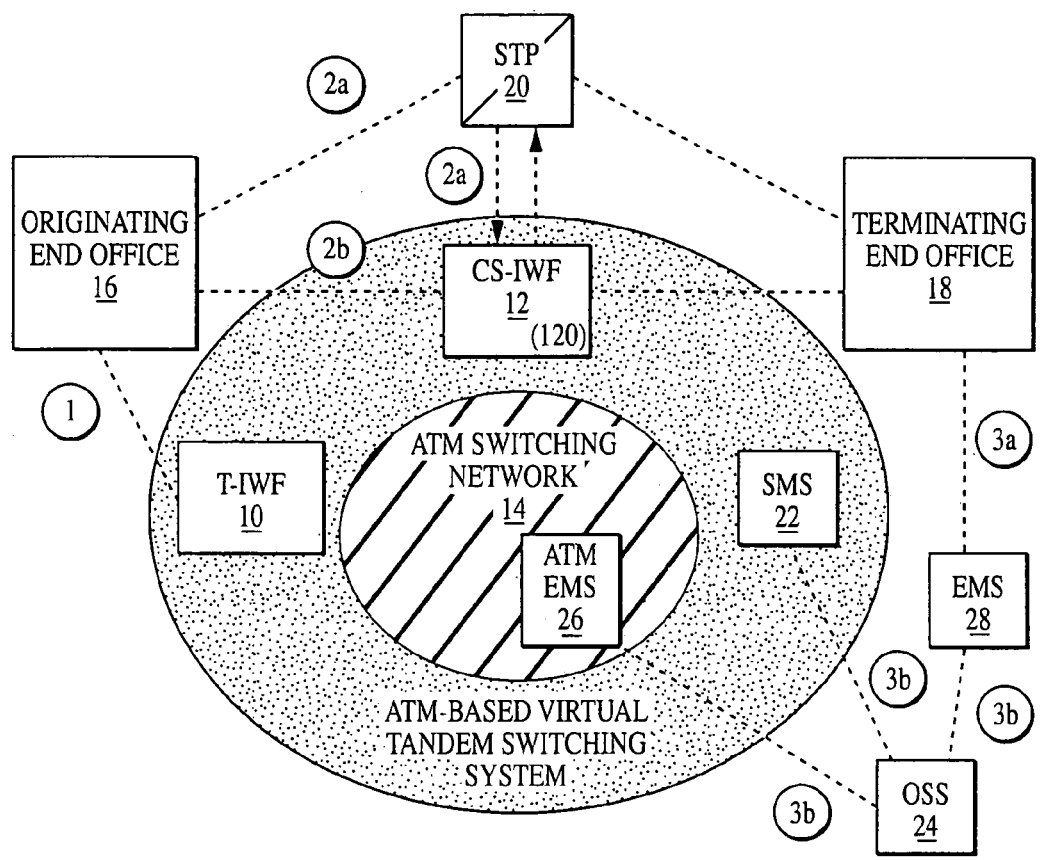
FIG. 2 shows traffic types that are excluded from the ATM network, according to one aspect of the present invention.

Traffic types excluded from traveling through the ATM network are now discussed with reference to FIG. 2.

Voice traffic is carried on TDM bearer channels 1. These bearer channels 1 extend from the customer premises (not shown) and through the Class 5 switch 16 to the trunk-interworking function (T-IWF) 10. By definition, these bearer channels 1 are not transported via the ATM network 14.

TDM control and OA&M traffic is segregated from ATM control and OA&M traffic. The physical security afforded by out-of-band signaling makes the current TDM-based voice network resistant to fraudulent use and malicious attacks. To retain these security benefits, certain traffic types can not be carried across the ATM network 14. For example, according to the invention, SS7 message traffic; and OA&M message traffic between traditional voice network elements and their EMSs 28 are not permitted to travel through the ATM switching network 14. Consequently, the VTOA network elements 10, 12, 22 deny all control and signaling access requests to traditional voice network elements that are received through the ATM network 14. Thus, the control signaling for the TDM network is restricted to and occurs only via the SS7 network. When such an access attempt is denied, an alarm is sent to the SMS 22 with a detailed description: The SMS 22 displays an appropriate alarm and logs the event.

Rather than via the ATM switching network 14, Signaling System No. 7 (SS7) ISUP messages are carried on A links 2a between Class 5 switches 16, 18 and the STP 20, and on A links 2a between STP 20 and CS-IWF 12. SS7 ISUP messages can alternatively be carried on F links 2b between Class 5 switches 16, 18 and the CS-IWF 12. A links 2a and F links 2b for SS7 ISUP messages are not mutually exclusive: both can appear in the same implementation. It is noted that STP ATM interfaces have now been standardized. Thus, when such interfaces are deployed, the associated requirement will reflect the standards.

Rather than via the ATM switching network 14, OA&M messages travel between traditional TDM voice network elements, e.g., end office 18, and their element management systems 28 as depicted by in independent link 3a. It is noted that although only a single element management system (28) is shown communicating with a single TDM voice network element (e.g., 18) in FIG. 2, additional communications occur. OA&M messages also travel between all element management systems (including the ATM EMS 26 and the VTOA SMS 22) and all OSSs 24, as depicted by lines 3b. In all cases, however, traffic between EMSs and OSSs is not carried through the ATM switching network 14.

The types of traffic allowed to travel through the ATM network are now discussed with reference to FIG. 3.

Voice traffic is carried on ATM bearer channels 4. These bearer channels 4 extend through the ATM switching network 14 from ingress T-IWF 10 to egress T-IWF 10, and from a T-IWF 10 via the ATM switching network 14 to an interexchange carrier (IXC) network.

Control traffic 5a travels between CS-IWF 12 and T-IWF 10. Control traffic 5b travels between distant portions of the CS-IWF 12. As discussed above and shown in FIG. 3, the functions of the CS-IWF 12 are not all implemented in the same network element. In either case, this traffic 5a, 5b may travel in-band across the ATM switching network 14 or out-of-band (e.g., on WAN connections, or, in the case of co-located VTOA network elements, on intra-office LAN connections). The LAN/WAN is a high security IP network. High security clearance is required for access into the LAN/WAN. When this traffic is interoffice, the traffic 5a, 5b is carried in-band across the ATM network. Control traffic that travels between two CS-IWFs 12, or between a CS-IWF 12 and a T-IWF 10 can be further categorized into messages for call control and "higher level" messages that are not associated with specific bearer channels but instead affect the overall workings of the ATM distributed tandem switching system.

ATM SVC signaling messages 6 (e.g., SETUP and RELEASE) manage bearer connections across the ATM switching network 14. These ATM SVC signaling messages 6 clearly travel in-band through the ATM switching network 14. Typical ATM SVC signaling messages 6 may travel between two T-IWFs 10, or between CS-IWF components 12 if the CS-IWF "proxies" for the T-IWFs. That is, when the T-IWF 10 does not have signaling intelligence, the CS-IWF 12 signals to the T-IWF 10, which simply passes the signaling onto the ATM network 14. In such a case, other pieces of equipment "believe" that the T-IWF 10 is signaling.

OA&M messages 7a travel between VTOA network elements and their switch management systems (SMSs) 22. OA&M messages 7b also travel between ATM switches 30 (although only one ATM switch 30 is shown in FIG. 3, the network typically includes more than one switch) and their element management systems 26. These OA&M messages may travel across the ATM network or out-of-band (e.g., on WAN connections, or, in the case of co-located VTOA network elements, on intra-office LAN connections). In instances where this traffic is inter-office, this traffic 7a, 7b is carried across the ATM switching network 14. One type of traffic in this category merits special consideration: commands and data with the potential to take a VTOA or ATM network element out of service, or to extinguish a large number of call requests or stable calls. A particular example is a software upgrade and attendant control messages (e.g., carrying installation instructions). As vendors work to simplify the process of upgrading software to new releases, they may arrange for new software loads to be transported to the intended ATM and/or VTOA network elements via the ATM switching network 14 from centralized point(s). It is clearly advantageous to protect the integrity of these downloads to the greatest extent possible, for example, by employing key based services (i.e., authentication).

Figure 3:
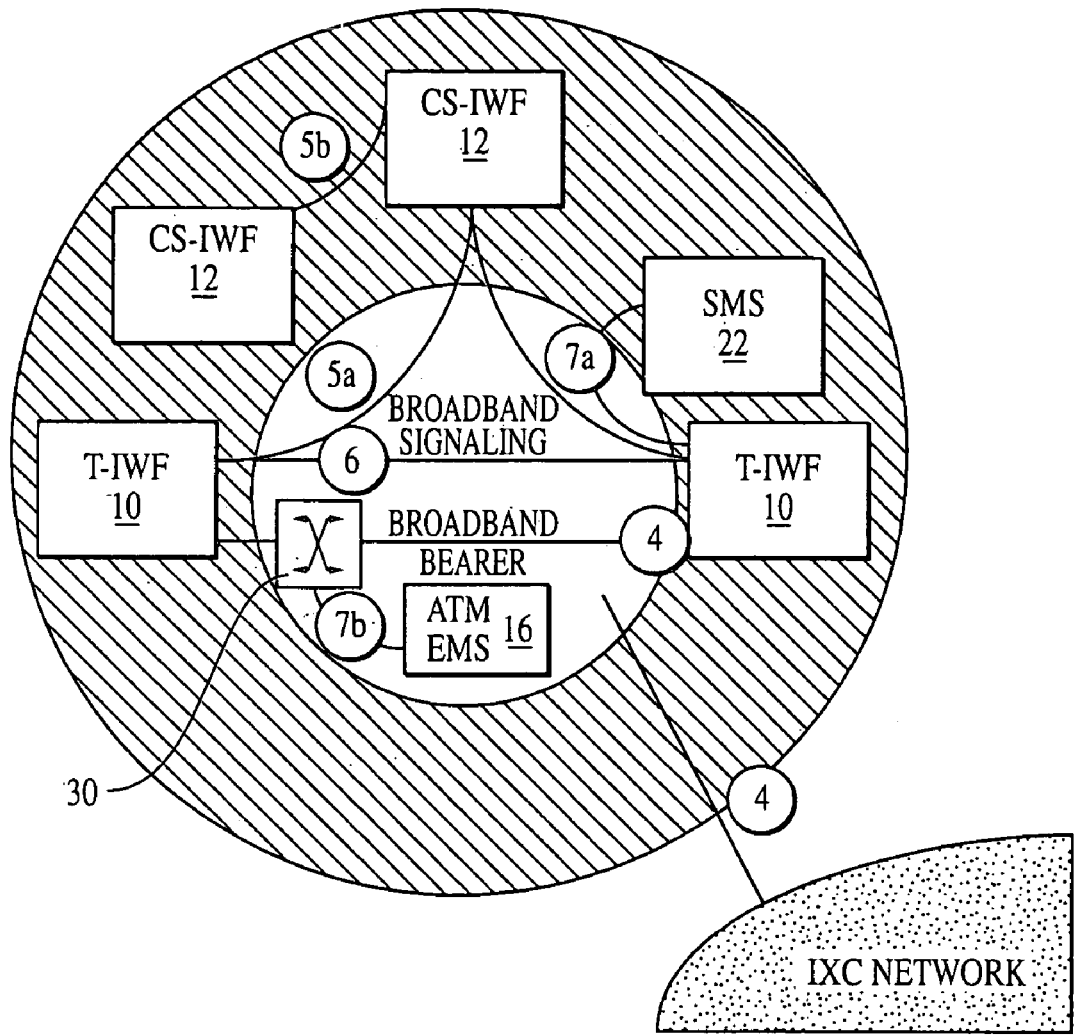
FIG. 3 shows traffic types that are allowed to traverse the ATM network, according to another aspect of the present invention.

Although not shown in FIG. 3, an ATM connection between the STP 20 and the CS-IWF 12 is a possible implementation option, especially when IP interfaces are available on STPs 20. In this case, IP-adapted SS7 traffic may be allowed to traverse the ATM network.

In a baseline embodiment, traffic that traverses the ATM network is controlled, primarily by the use of closed user groups (CUGs). Closed user group (CUG) refers to an access control mechanism. Closed user groups are typically used to enable and disable Switched Virtual Circuit (SVC) connections to and from designated groups of subscribers. That is, closed user groups are used to control end systems' privileges vis-à-vis SVC services. The ATM Forum's efforts to standardize closed user groups have not been completed. Thus, ATM vendors typically base their closed user groups implementations on ITU-T Recommendation Q.2955.1, "Stage 3 Description for Community of Interest Supplementary Services Using B-ISDN DSS 2: Closed User Group (CUG)," June 1997, the disclosure of which is expressly incorporated by reference herein in its entirety. According to the present embodiment, closed user groups are established and maintained from the ATM EMS 26. Thus, closed user groups should be transparent to the VTOA network elements. In particular, closed user group IDs and interlock codes are assigned and maintained by the ATM EMS 26.

Closed user group service provides a way to group users and to restrict access to and from users based on closed user group membership status. A given user can be a member of more than one closed user group.

Typically, members of the same closed user group can call each other but cannot call non-closed user group users (whether the latter are members of different closed user groups or of no closed user groups at all). However, other configuration options are available. "Incoming-Access" and "Outgoing Access" are closed user group configuration parameters that can be used to allow communication with users outside one's own closed user group.

Closed user groups are implemented via information elements (IEs) that are appended to, and travel with, call setup requests. Therefore, when closed user group service is added to a network, the signaling flows for call setups (specifically ATM SVC setups) do not change. If a call setup request is rejected for a closed user group-related reason, the cause code in the rejection message will indicate this fact. This enlargement of the set of possible failure cause codes and the piggybacking of closed user group information elements on messages would usually be the only changes to signaling that would become necessary with the addition of closed user group service. For more information about closed user groups, see chapter 15 of "NavisCore ATM Configuration Guide," available from Lucent Technologies, Inc., the disclosure of which is expressly incorporated by reference herein in its entirety.

In one embodiment of the invention, all VTOA network elements are grouped into one or more closed user groups as a configuration option implemented via the ATM EMS 26. These closed user groups contain no non-VTOA network elements. Thus, it is not necessary to involve the VTOA SMS 22 in the provisioning or maintenance of closed user groups. More than one closed user group will exist when the number of VTOA network elements exceeds a limit imposed on the number of elements allowed in each closed user group. The ATM switches and the ATM element management system (EMS) are not members of the closed user group per se. Rather, the ATM switches enforce the SVC access restrictions that are put in place by the closed user group features of the ATM element management system.

With respect to protecting the integrity of critical traffic, it is advantageous that the ATM switch network prevents all attempts by non-VTOA network elements to masquerade as VTOA network elements via address spoofing in signaling messages (e.g., by performing source address verification at the UNI). Specifically, whenever an ATM switch receives a UNI SETUP message from an end system, the switch verifies that any ATM End System Address contained in the calling party number or calling party subaddress information element is consistent with the physical port/UNI or virtual UNI to which the end system is attached to that ATM switch. Moreover, no default identifier, address, route, etc. is provisioned. The identification by switch ports/UNIs is intended to prevent "address spoofing", i.e., attempts to access VTOA network elements from non-VTOA networks elements by inserting fraudulent data into the calling party number information elements of UNI SETUP messages. For example, "spoofing" is illustrated by the case when a non-VTOA network element attached to UNI A pretends to be at UNI B, where a VTOA network element is attached, by inserting UNI A identification information in the setup message. This identification requirement seeks to prevent such spoofing.

The identification requirement can be satisfied as follows: For each SETUP message received by an ATM switch from the subscriber side of an attached UNI, the calling party number information element is validated against the network prefix assigned to that UNI. In this respect, it should be noted that an ATM End System Address (AESA) consists of a network prefix, an End System Identifier (ESI), and a 1-byte selector (SEL) field. These three fields do not overlap. The network prefix portion of the AESA is typically identical for all end systems attached to the same User-to-Network Interface (UNI)). In the NavisCore management system for the Lucent GX550 ATM Switch, validating against the network prefix is called "Source Address Validation." It is noted that there may be more than closed user group member at any given UNI. For example, a trunk interworking function may have multiple ports, and these ports may have different ATM end system addresses.

The ATM EMS 26 establishes membership lists for all closed user groups. Only members of the same closed user group are permitted to communicate with each other across the ATM network 14. "Incoming Access" and "Outgoing Access" are disabled for each VTOA network element.

Only the administrator can create or edit closed user group membership lists. Moreover, the list may only be created and edited through the ATM EMS 26. Multiple lists are supported for quick reconfiguration of groups, or backups. Redundancy is the main issue in that for survivability purposes, closed user group membership list(s) must be maintained at physically separate locations. If either members of the closed user groups or network elements are geographically diverse, synchronized copies of the same closed user group membership list can be guaranteed by sufficient redundancy.

Attempts to communicate with or access a VTOA network element via the ATM network 14 by a source not matched on the closed user group list shall be denied. In particular, VTOA network elements should not be provisioned in a way that allows them to be accessed from outside the closed user group via Anycast addresses.

When an attempt to communicate with or access' a VTOA network Element is denied, the denying ATM network element (switch or other element in the ATM network) sends an alarm to the ATM EMS 26, including a detailed description. The ATM EMS 26 also displays an appropriate alarm and logs the event.

Figure 4:
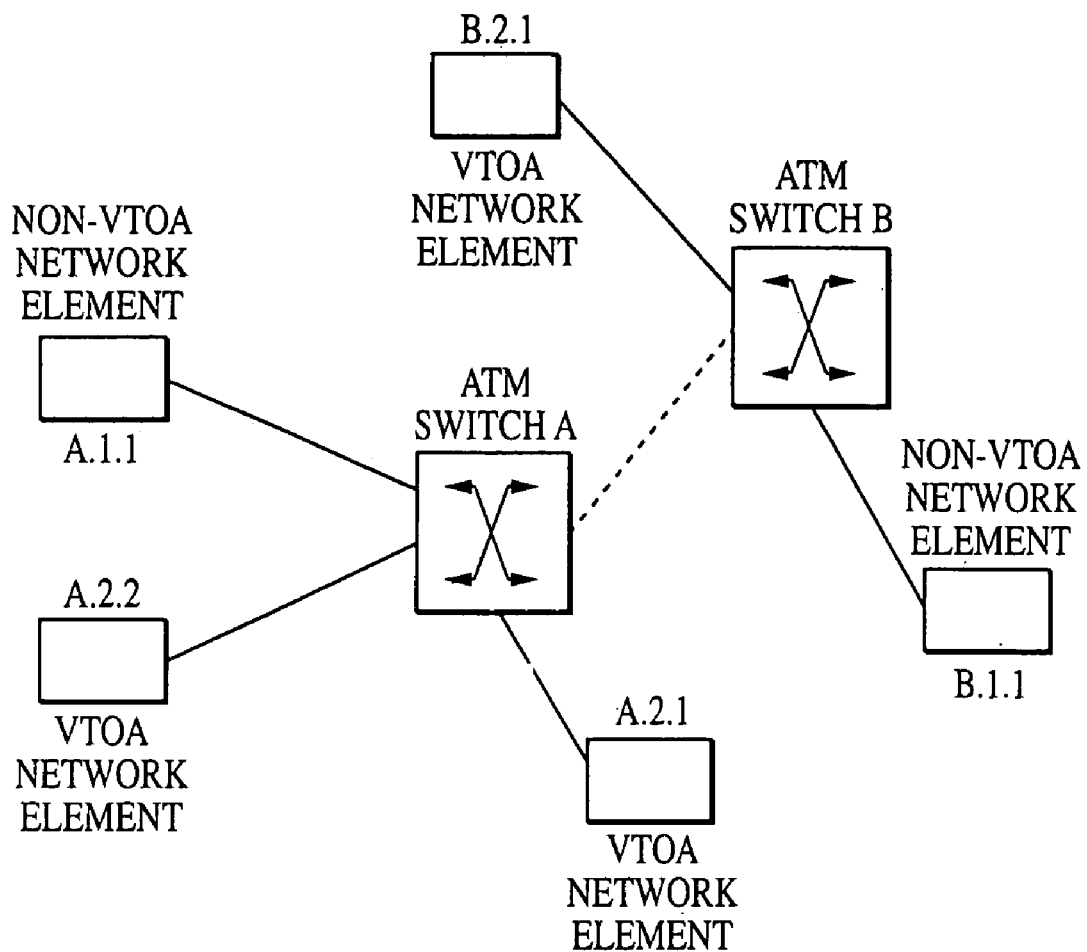
FIG. 4 shows an exemplary network including a VTOA closed user group and non-VTOA network elements outside of the closed user group.
Figure 4:
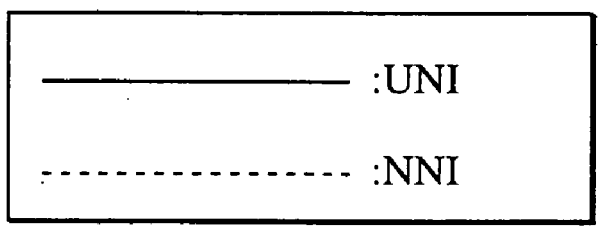

Thus, according to the present invention, one or more closed user groups are implemented in a way that denies any attempt to set up a Switched Virtual Circuit (SVC) between a VTOA Network Element and a non-VTOA Network Element. FIG. 4 show an example of a closed user group implementation. In FIG. 4, ATM End System Addresses (AESAs) are represented schematically by labels of the form A.x.y and B.w.z. In FIG. 4, the leftmost portion of the AESA (schematically, the first character) identifies the ATM switch to which the end system is attached. Note that the second character in the example serves to delineate between VTOA and non-VTOA network elements.

A sample VTOA closed user group membership list is shown below.

ATM End System Address (AESA)

A.2.*

B.2.*

The "*" character functions as a wildcard, indicating that any AESA beginning with A.2 or B.2 represents a member of the closed user group.

In FIG. 4, VTOA network elements A.2.1, A.2.2 and B.2.1 form a closed user group. Non-VTOA network elements A. 1.1 and B. 1.1 do not belong to this closed user group. When a new VTOA network element is attached to switch A, it will be assigned an AESA beginning with A.2 (such as A.2.3). When a new Non-VTOA network element is introduced, the Non-VTOA network elements must be assigned AESAs that fail to match the prefixes A.2 and B.2. Although the example described with reference to FIG. 4 shows one implementation, implementation details will vary depending on the AESA administration plan.

Sample access settings for VTOA closed user group members are shown in Table 1 below.

TABLE 1

| AESA | Communicating with Other Members of the VTOA CUG | | Communicating with Network Elements Outside the VTOA CUG | |
| --- | --- | --- | --- | --- |
| | Incoming Calls Barred (ICB) | Outgoing Calls Barred (OCB) | Incoming Access (IA) | Outgoing Access (OA) |
| A.2.* | Disabled | Disabled | Disabled | Disabled |
| B.2.* | Disabled | Disabled | Disabled | Disabled |

According to the ICB and OCB settings shown in Table 1, attempts to communicate within the VTOA CUG will not be denied based on closed user group considerations. According to the "Incoming Access" and "Outgoing Access" settings shown in Table 1, attempts to set up calls between members (of the VTOA closed user group) and non-members will be denied, regardless of whether a member tries to call a non-member or a non-member tries to call a member.

It is noted that each closed user group member includes configuration information, such as the parameters shown in Table 1. That is, the closed user group information elements do not carry the access privilege information. Rather, the ATM switches keep track of this information (as configured by the ATM EMS) and enforce any configured access restrictions.

Further, in a baseline embodiment, traffic that traverses the ATM network is policed. Policing typically arises in the context of traffic management; however, in the described embodiment, policing plays a role in VTOA security as a last line of defense against malicious overloading.

The ATM network employs per virtual channel (VC) traffic policing on control/signaling VCs in order to prevent malicious overloading of the control system, or potential voice toll fraud such as carrying user traffic in a control connection. The ATM network also employs per VC traffic policing on VCs carrying user data in order to prevent malicious overloading of the network. Such policing may include limiting the volume of traffic by counting cells per time period.

Usage parameter control (UPC) can be used to insure that all sources comply with their traffic contracts. Details about traffic contracts and UPC can be found in "Traffic Management Specification, Version 4.0," ATM Forum Technical Committee Document af-tm-0056-000, April 1996, the disclosure of which is expressly incorporated by reference herein in its entirety.

A baseline embodiment implements UPC in a VTOA environment. In the VTOA architecture, the essential ATM traffic categories are constant bit rate (CBR) and variable bit rate (VBR). For any traffic source of this type, compliance with the traffic contract is unambiguously defined in terms of the Generic Cell Rate Algorithm (GCRA). The UPC function can discard non-compliant cells at the UNI, or tag non-compliant cells (by setting the cell loss priority bit to 1) for potential discard at network congestion points.

In an alternate embodiment, for example, in the case of a multi-service network, unspecified bit rate (UBR) and/or available bit rate (ABR) ATM traffic may also be present. Traffic contract compliance for UBR sources can also be defined in terms of the GCRA. For ABR sources, the definition of traffic-contract compliance can vary from network to network, but UPC must be implemented in such a way that compliant traffic sources (of any category) are unaffected by non-compliant sources.

In other embodiments, ATM traffic is further controlled. Such control is employed when inter-carrier connections exist, and/or when multi-service dimensions to VTOA deployments exist, and/or when standards-based signaling between CS-IWF and T-IWF components occurs, and/or when networks are not dependent on out-of-band SS7 signaling to connect end users to ATM bearer channels, but can instead complete end-to-end calls entirely via in-band signaling over the ATM network. These additional requirements are aimed at restricting the flow of information (such as information about the local carrier's—as opposed to another carrier's—network topology) to other carriers' networks, and at denying attempts to control VTOA network elements from points outside the local carrier's network. It is noted that although the term "local carrier" is being used, local carrier is not intended to limit the network to a network solely serving intraLATA calls. Rather, local carrier is used to indicate the carrier operating the VTOA system.

When the local carrier enters into agreement(s) to hand off calls to other carriers as ATM streams, additional requirements are imposed to maintain appropriate network security. Note that these requirements are not purely ATM-specific. In particular, the VTOA SMS 22 capabilities are affected as well.

At the call control level, the SMS 22 and/or ATM EMS 26 support the creation and editing of a list identifying CS-IWFs in other networks with communications permissions. Consequently, attempts made by unauthorized sources will be rejected, with an alarm and detailed message sent to the SMS 22. This requirement may be fulfilled by setting up inter-carrier closed user groups via ATM EMSs 26, or via an equivalent mechanism implemented in the SMS 22. Those skilled in the art will recognize mechanisms implemented in the SMS 22 that are equivalent to the intercarrier closed user groups via the ATM EMS 26.

In this embodiment, messages from CS-IWFs in other networks, other than those necessary for control of intercarrier calls, are discarded. When such messages are detected, an alarm is sent to the SMS 22 with a detailed description. The SMS 22 displays an appropriate alarm and logs the event.

When distributed dynamic routing protocol(s), such as PNNI, are implemented in the local carrier's networks, the routing domain is restricted to the local carrier's networks only. Consequently, routing information is not distributed to non-local carriers' networks. Moreover, inter-network routing is provisioned statically.

Broad categories of ATM security services are discussed below.

Table 2 lists and briefly describes four major categories of security services. For more details about each of the four major categories, refer to The ATM Forum Technical Committee, "ATM Security Specification, Version 1.0" AF-SEC-0100.001, February, 0.1999, the disclosure of which is expressly incorporated herein by reference in its entirety.

TABLE 2

| Category of Security Service | Approach/Comments | Type of Threat Service Guards Against |
| --- | --- | --- |
| Entity Authentication | Refers to procedures that "bootstrap" the security infrastructure (e.g., use of cryptographic algorithms to enable secure initial exchange of keys between security agents). | |
| Confidentiality | Payload only encryption of ATM cells using symmetric (secret key) algorithms. This service functions at the ATM layer. | Unauthorized disclosure of data transported via ATM cells. |
| Integrity | Append cryptographic signature to each AAL service data unit (SDU). Note: This only applies to AAL 3/4 and/or AAL 5. This service functions between AAL endpoints. There are two distinct subcategories: | Detect modification of: |
| with replay/reordering protection | A sequence number is appended to the AAL service data unit (SDU) and the resulting bit string, in its entirety, is fed to the algorithm that computes the signature. | Data values or sequences of data values. In particular, this mechanism seeks to detect when a message has been maliciously duplicated and replayed. It also seeks to detect when a message has been altered. |
| without replay/reordering protection | The (unaltered) AAL service data unit (SDU) is the input to the crypto-signature algorithm. | Data values only. This mechanism seeks to detect when a message has been altered. This mechanism may be used if sequencing information need not be protected or (as in the case of TCP/IP) sequencing information is already present in the AAL service data unit (SDU). |
| Access Control | Refers to application of a set of rules to requests for service. In the case of Closed User Groups; these rules are based on source and/or destination user identities. | Origination of ATM signaling messages (e.g., UNI SETUP, RELEASE) by unauthorized parties, when these messages are targeted at VTOA network elements. |

It is noted that confidentiality and integrity services are based on cryptographic algorithms. Thus, the services are costly in (at least) two ways:

1. Before cryptography-protected transmissions between endpoint security agents can take place, secure initial key exchange (see "authentication" in Table 1) must be completed. Thus, administrative costs are associated with managing cryptographic keys.

2. The cryptographic algorithms themselves exact a performance toll.

Because of the attendant administrative and performance costs, confidentiality and integrity services are not included in the baseline embodiment. These costs must be weighed carefully in consideration of alternate embodiments in which the ATM network switches intercarrier (IXC) traffic, and/or the VTOA traffic is carried by a multi-service ATM network, and/or signaling between CS-IWFs and T-IWFs is standards based.

A priority ordering for types of traffic that may require authentication, integrity and/or confidentiality services is now discussed. As stated above, integrity services append cryptographic signatures to AAL 5 service data units. Confidentiality services perform payload-only encryption/decryption of ATM cells. Authentication services perform secure key exchanges, which are necessary to bootstrap confidentiality and integrity services.

It is noted that the closed user group requirements, discussed above, are designed to defeat all attempts by unauthorized parties to establish switched connections with VTOA network elements. Thus, closed user groups provide a base level of protection to VTOA traffic that traverses the ATM network.

For bearer ATM connections, no additional security requirements are contemplated, in addition to the base level requirements. That is, integrity services are not applicable to bearer traffic because integrity services are restricted to traffic adapted by AAL 3/4 or AAL 5. Bearer traffic employs AAL 1 or AAL2 in the VTOA system. Confidentiality services are not contemplated for bearer traffic because the performance toll of cryptographic algorithms would be too great.

The following discussion assumes that the ATM switches that make up the fabric of the distributed tandem are separate network elements from those elements implementing the T-IWF and CS-IWF functions.

Authentication is applicable to key exchanges for setup of confidentiality and integrity services. The service should be employed to support the confidentiality and integrity services. It is implemented based on cryptographic algorithms.

The confidentiality service is employed for commands and data that could cause a VTOA or ATM network element to go out of service or drop a large number of calls. Multicarrier VTOA deployments precipitate the need for the confidentiality service. Multi-service deployments may trigger the need for the service. The service is implemented in the SMS 22, the CS-IWF 12 and in the T-IWF 10, and is transparent to the ATM network 14.

Control traffic exchanged between CS-IWF 12 and T-IWF 10 components or among other remote portions of the CS-IWF 12 whenever the traffic is carried across the ATM network 14 should also be protected by the confidentiality service. Standards based signaling between the CS-IWF 12 and the T-IWF 10 in multicarrier environments trigger this requirement. In addition, networks placing calls with ATM in-band signaling in multicarrier environments trigger this requirement. The service is implemented in the CS-IWF 12 and the T-IWF 10, and is transparent to the ATM network 14.

The integrity service is also employed for commands and data that could cause a VTOA or ATM network element to go out of service or drop a large number of calls. Multicarrier VTOA deployments precipitate the need for the integrity service. Multi-service deployments may trigger the need for the service. The service is implemented in the SMS 22, the CS-IWF 12 and in the T-IWF 10, and is transparent to the ATM network 14.

Control traffic exchanged between CS-IWF 12 and T-IWF 10 components or among other remote portions of the CS-IWF 12 whenever the traffic is carried across the ATM network 14 should also be protected by the integrity service. Standards based signaling between the CS-IWF 12 and the T-IWF 10 in multicarrier environments trigger this requirement. In addition, networks placing calls with ATM in-band signaling in multicarrier environments trigger this requirement. The service is implemented in the CS-IWF 12 and the T-IWF 10, and is transparent to the ATM network 14.

The following requirements use the terminology presented above. In determining whether these requirements will be put in force, operations costs and performance costs of these security services should be assessed.

For OA&M traffic which could cause a VTOA or ATM network element to go out of service, or to drop a large number of calls, confidentiality and integrity services are implemented and enabled. For control traffic exchanged between CS-IWF and T-IWF devices, or between CS-IWF components, confidentiality and integrity services are implemented and enabled.

In a multi-service network, it may be desirable to deploy network elements that combine VTOA and non-VTOA functions. For example, referring back to FIG. 4, elements A.1.1 and A.2.2 may be a single piece of equipment, attached to ATM switch A via a single physical link. In this case, virtual UNIs can (and should) be used to establish a logical separation between the functions associated with A.1.1 and A.2.2.

That is, VTOA network elements and non-VTOA network elements are never connected to the same UNI. In the case when a VTOA network element is also an ATM-network access point for non-VTOA service(s), these service(s) can be offered via a distinct "non-VTOA" virtual UNI. The virtual UNI provides a secure way to segregate VTOA from other services in the case that VTOA and non-VTOA access are not always physically separate (by making certain that no member of a VTOA closed user group has an address prefix matching that of any non-VTOA UNI). An example of a VTOA network element providing non-VTOA services is an edge device that processes frame relay or native ATM communications.

The ATM EMS 26 generates logs of significant security events. EMS event logging and auditing capabilities are now described. The security events are categorized according to granularity. Baseline capabilities include logging the identities of all user who have logged on, and all applications that were executed. In addition, the identities of the network elements that were accessed should be logged. An highly desirable enhanced capabilities is logging which commands were executed and which data/parameters were supplied by the user when the commands were invoked.

The ATM vendor may incorporate the capabilities of the baseline embodiment into the ATM EMS. The basic types of information are necessary for effective auditing, which is an integral part of any security policy. In another embodiment, requirements for the development of filtering and alarming features to assist in auditing are satisfied.

The items in the enhanced capabilities category are not necessarily security information per se and will not be addressed further. It is noted, however, that data collection capacities at this increased level of granularity are important from an operations point of view (e.g. for reconstructing a chain of events).

In another embodiment, the ATM EMS 26 maintains a list of all active user identities and collects security log information (including user ID, application(s) executed, and network elements accessed) to identify security breaches or theft of customer services. Each recorded security event is accompanied by a time stamp.

The ATM EMS 26 constantly reviews security log information, filters redundant information, and, when appropriate, generates security alarms and recommended courses of action, including automatic (or scheduled) virus checks. In addition, the ATM EMS 26 supports administrator definable parameters for filtering security log information and generating different types and severities of security alarms.

According to the present invention, ATM-specific security requirements for VTOA are defined. In the baseline embodiment, it is assumed that ATM deployments include dedicated ATM networks, and intercarrier traffic is converted to TDM for handoff to other carriers. In alternative embodiments, for example, when multi-service, multi-carrier VTOA deployments exist, additional requirements are set forth.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor, including switches, etc. Dedicated hardware implementations including, but not limited to, application specific integrated circuits, programmable logic arrays and other hardware devices can likewise be constructed to implement the methods described herein. It should also be noted that the software implementations of the present invention can be stored on a tangible storage medium such as a magnetic or optical disk, read-only memory or random access memory and be produced as an article of manufacture.

Although the present specification describes components and functions implemented in the embodiments with reference to particular standards and protocols, the invention is not limited to such standards and protocols. Each of the standards for ATM and other packet-switched network transmission (e.g., IP, PNNI, UNI); ATM standards promulgated by the ATM Forum, as referred to herein, and public telephone networks (ISDN, ATM, xDSL) similarly represent examples of the state of the art. Such standards are periodically superseded by faster or more efficient equivalents having essentially the same functions. Accordingly, replacement standards and protocols having the same functions are considered equivalents.

What is claimed is:

1. A method for providing secure communications through a communications network comprising ATM channels and TDM channels, the communications network including at least one closed user group of network elements configured to communicate with only other network elements in the closed user group, the method comprising:
   receiving a connection setup request at an ingress ATM switch, via a UNI attached to the ATM switch, in response to a call initiated through a TDM channel, the UNI interfacing a first network element of the closed user group with the ATM switch;
   verifying that an ATM End System Address (AESA) contained in calling party information of the connection setup request is consistent with the attached UNI; and
   establishing a connection with at least a second network element of the closed user group through an egress ATM switch in the communications network when the AESA is consistent with the attached UNI.

2. The method for providing secure communications through the communications network, according to claim 1, further comprising:
   denying access to the second network element of the closed user group when the AESA is not consistent with the attached UNI.

3. The method for providing secure communications through the communications network, according to claim 2, further comprising:
   sending an alarm to an ATM element management system when the AESA is not consistent with the attached UNI.

4. The method for providing secure communications through the communications network, according to claim 1, in which the attached UNI comprises a physical port/UNI.

5. The method for providing secure communications through the communications network, according to claim 1, in which the attached UNI comprises a virtual UNI.

6. The method for providing secure communications through the communications network, according to claim 1, in which verifying the AESA comprises comparing a network prefix of the AESA to a network prefix previously assigned to the UNI.

7. The method for providing secure communications through the communications network, according to claim 1, further comprising:
   establishing a membership list at an ATM element management system identifying each network element that is part of the closed user group; and
   verifying that each of the first network element and the second network element belongs to the closed user group using the membership list, prior to establishing the connection.

8. The method for providing secure communications through the communications network, according to claim 1, in which the first network element and the second network element comprise trunk interworking function (T-IWF) devices configured to convert between voice streams from TDM channels to cell streams from ATM channels.

9. The method for providing secure communications through the communications network, according to claim 1, in which the connection comprises a switched virtual circuit connection.

10. A system for enforcing switched virtual circuit (SVC) access restrictions across an Asynchronous Transfer Mode (ATM) distributed virtual tandem switching system based on closed user groups of network elements in a communications network, the system comprising:
   a plurality of trunk interworking function (T-IWF) devices in the communications network, configured to convert between voice streams from TDM communications channels to cell streams from ATM communications channels, a first one of the plurality of T-IWF devices receiving a call via at least one TDM communications channel from an end office;
   a centralized control and signaling interworking function (CS-IWF) device that receives narrowband signaling data relating to routing the call, the CS-IWF device converting the narrowband signaling data to broadband signaling data to control the call through an ATM switching network and determining that the call is directed to a second one of the plurality of T-IWF devices, the plurality of T-IWF devices and the CS-IWF device being in a previously established closed user group;

an ATM switch in the ATM switching network that receives a request from one of the CS-IWF device and the T-IWF devices to establish an SVC connection of the call over the ATM switching network;

an ATM element management system that stores a list of network elements in the closed user group, including the CS-IWF device and the plurality of T-IWF devices, the determination of whether the CS-IWF device, the first T-IWF device and the second T-IWF device are in the closed user group being based on the list of network elements;

wherein the ATM switch establishes the SVC connection over the ATM switching network, enabling broadband communication between the first T-IWF device and the second T-IWF device, when the CS-IWF device, the first T-IWF device and the second T-IWF device are determined to be in the closed user group;

wherein the ATM switch does not establish the SVC connection over the ATM switching network when at least one of the CS-IWF device, the first T-IWF device and the second T-IWF device is determined not to be in the closed user group; and wherein the ATM switch verifies that an ATM End System Address (AESA) contained in calling party information in the request from the CS-IWF device is consistent with a user-to-network interface between the first T-IWF device and the ATM switch, the ATM switch rejecting the request to establish the SVC connection over the ATM switching network when the AESA is not consistent with the UNI.

11. The system for enforcing SVC access restrictions according to claim 10, in which the ATM switch sends an alarm to the ATM element management system when the AESA is not consistent with the UNI.

12. The system for enforcing SVC access restrictions according to claim 10, in which the UNI comprises a physical port/UNI.

13. The system for enforcing SVC access restrictions according to claim 10, in which the UNI comprises a virtual UNI.

* * * * *